United States Patent
Rick

(10) Patent No.: US 8,585,077 B2
(45) Date of Patent: Nov. 19, 2013

(54) MOTOR VEHICLE HAVING HEAD AIRBAG

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 12/637,400

(22) Filed: Dec. 14, 2009

(65) Prior Publication Data

US 2010/0156073 A1 Jun. 24, 2010

(30) Foreign Application Priority Data

Dec. 15, 2008 (DE) .................. 10 2008 062 267

(51) Int. Cl.
*B60R 21/205* (2011.01)
*B60R 21/213* (2011.01)
*B60R 21/217* (2011.01)
*B60R 21/232* (2011.01)

(52) U.S. Cl.
USPC .............. 280/728.2; 280/730.2; 280/732

(58) Field of Classification Search
USPC .................... 280/730.2, 728.2, 732
IPC .............. B60R 21/205,21/213, 21/232, 21/217
See application file for complete search history.

(56) References Cited

U.S. PATENT DOCUMENTS

| | | | | |
|---|---|---|---|---|
| 3,514,125 A * | 5/1970 | Nemecek | ............... | 280/728.2 |
| 5,651,562 A * | 7/1997 | Hagen et al. | ............... | 280/728.3 |
| 6,010,147 A * | 1/2000 | Brown | ............... | 280/728.2 |
| 6,079,735 A | 6/2000 | Fallmann et al. | | |
| 6,155,594 A | 12/2000 | Ibe et al. | | |
| 6,176,513 B1 | 1/2001 | Neidert | | |
| 6,241,278 B1 | 6/2001 | Roote et al. | | |
| 6,382,660 B1 | 5/2002 | Starner et al. | | |
| 6,409,210 B1 | 6/2002 | Emerling | | |
| 6,431,583 B1 * | 8/2002 | Schneider | ............... | 280/728.2 |
| 6,948,736 B2 * | 9/2005 | DePottey et al. | ............... | 280/728.2 |
| 6,951,348 B2 * | 10/2005 | Enders | ............... | 280/728.2 |
| 7,467,807 B2 | 12/2008 | Hayashi et al. | | |
| 7,784,817 B2 * | 8/2010 | Choi et al. | ............... | 280/728.2 |
| 8,123,249 B2 * | 2/2012 | Zischka | ............... | 280/741 |
| 2002/0105173 A1 | 8/2002 | Saderholm et al. | | |
| 2003/0001366 A1 * | 1/2003 | Debler et al. | ............... | 280/732 |
| 2006/0055153 A1 * | 3/2006 | Hirata | ............... | 280/728.1 |

FOREIGN PATENT DOCUMENTS

| | | |
|---|---|---|
| DE | 29616904 U1 | 1/1997 |
| DE | 19955023 A1 | 5/2000 |
| DE | 10039801 A1 | 2/2002 |
| DE | 10133454 A1 | 1/2003 |
| DE | 102004046422 A1 | 4/2005 |

(Continued)

OTHER PUBLICATIONS

German Patent Office, German Search Report for German Application No. 102008062267.2, Dec. 23, 2010.

(Continued)

*Primary Examiner* — Joseph Rocca
*Assistant Examiner* — Joselynn Y Sliteris
(74) *Attorney, Agent, or Firm* — Ingrassia Fisher & Lorenz, P.C.

(57) ABSTRACT

A motor vehicle, in particular a passenger automobile, is provided with a vehicle body, at least one head airbag and one gas generator for filling the head airbag. The gas generator being fastened to an element of the vehicle body that extends essentially in the vehicle transverse direction.

11 Claims, 2 Drawing Sheets

(56) References Cited

FOREIGN PATENT DOCUMENTS

| | | |
|---|---|---|
| DE | 60021467 T2 | 6/2006 |
| DE | 102006051089 A1 | 4/2008 |
| EP | 0889807 A1 | 1/1999 |
| EP | 1221400 A1 | 7/2002 |
| EP | 1676758 A1 | 7/2006 |
| EP | 2036784 A2 | 3/2009 |
| GB | 2349616 A | 11/2000 |
| JP | 2003048503 A | 2/2003 |
| JP | 2004249932 A | 9/2004 |
| WO | 9930932 A1 | 6/1999 |

OTHER PUBLICATIONS

British Patent Office, British Search Report for British Application No. GB0921030.3, Mar. 17, 2010.

UKIPO, British Examination Report for Application No. GB0921030.3, dated Dec. 31, 2012.

UKIPO, British Examination Report for Application No. GB0921030.3, dated Jun. 18, 2013.

* cited by examiner

MOTOR VEHICLE HAVING HEAD AIRBAG

CROSS-REFERENCE TO RELATED APPLICATION

This application claims priority to German Patent Application No. 102008062267.2, filed Dec. 15, 2008, which is incorporated herein by reference in its entirety.

TECHNICAL FIELD

The present invention relates to a motor vehicle, in particular a passenger automobile, having a vehicle body, at least one head airbag, and a gas generator for filling the head airbag, the gas generator being fastened to an element of the vehicle body, and a method for installing a head airbag system in such a motor vehicle.

BACKGROUND

A so-called head airbag, also referred to as a curtain airbag or window airbag, essentially unfolds on a vehicle interior in the event of an accident, in order to protect the head area of occupants in the event of a side impact or a rollover of the vehicle in particular and prevent the head of an occupant from projecting outward unprotected through an open side window during the accident.

Fastening the head airbag and the gas generator for filling the head airbag on an inner roof frame, which advantageously keeps the pathway of the filling gas between gas generator and head airbag short, is known from EP 1 221 400 B1. Not only does the installation space for the gas generator disadvantageously impair the head area of the passenger compartment in this case, but rather the noise generation of the activated gas generator also impairs the hearing of the occupants located in direct proximity to the gas generator.

DE 199 55 023 A1, EP 0 889 807 B1, and DE 101 33 454 A1 therefore propose situating the gas generator on the A or B column of the vehicle body. U.S. Pat. No. 6,382,660 B1, which discloses a motor vehicle like the above-mentioned publications, lists a dashboard and a girder structure of the vehicle body as possible fastening locations in addition to the fastening on the A column.

Fastening on a dashboard, which does not represent a part of the vehicle body, but rather is in turn supported thereon, is not optimal for the fastening of the gas generator, because high acceleration forces are developed upon its triggering and must be supported using correspondingly large retention forces. The known fastening on the A column, which essentially extends in the vehicle vertical and longitudinal directions, is also not optimal in regard to the retention forces to be absorbed and the deformation of the vehicle body in the event of an accident, upon which the gas generator is to be triggered in particular.

At least one object of the present invention is to provide an improved head airbag system. In addition, other objects, desirable features, and characteristics will become apparent from the subsequent summary and detailed description, and the appended claims, taken in conjunction with the accompanying drawings and this background.

SUMMARY

A motor vehicle, in particular a passenger automobile, according to an embodiment of the present invention comprises a vehicle body, one or more head airbags, and one or more gas generators for filling the head airbag(s), one or more of these gas generators being fastened on an element of the vehicle body. The head airbag(s) may at least partially extend along an A column, B column, C column, and/or at least a section of a roof side area, for example. Each head airbag can be filled by one or more gas generators and/or one gas generator can be provided for filling one or more head airbags.

It is proposed according to an embodiment of the invention that the gas generator be fastened on an element of the vehicle body which extends essentially in the vehicle transverse direction, for example, a windshield crossbeam or a bulkhead.

In contrast to known fastenings on elements of the vehicle body which extend essentially in the vehicle longitudinal or vertical directions, for example, an A or B column, a force which the gas generator exerts on the vehicle body element upon its triggering is introduced thereby into the remaining vehicle structure at the two lateral attachments of the vehicle body element thereon, which is advantageous because of the greater lever arms and the typically greater transverse stiffness of vehicle structures. Because of the greater transverse stiffness, a deformation of such vehicle body elements extending in the vehicle transverse direction is normally less than a deformation of an element which extends in the vehicle vertical direction, like the A column, and is therefore frequently compressed in particular in the event of rollovers, during which the head airbag is to protect in particular. The installation also proves to be advantageously simpler with a vehicle body element extending in the vehicle transverse direction than in the limited space of lateral elements such as the A or B column. The fastening on a vehicle body element ensures, in contrast to fastening on an interior panel, in particular a dashboard, an optimum force introduction into the vehicle structure.

The gas generator is preferably received entirely or partially in a depression of the vehicle body element, which can preferably be implemented in a vertical side and/or a cover side of the vehicle body element, i.e., opens in the vehicle longitudinal direction, in particular to the rear, and/or in the vehicle vertical direction, in particular on top. In this way, the gas generator can support itself positively on the vehicle body element optimally and is additionally protected thereby from damage and environmental influences.

The gas generator is preferably removably fastened on the vehicle body element, for example, screwed thereon, and/or positively fastened on the vehicle body element, in particular by one or more detent connections, which can make installation and replacement easier.

The gas generator preferably has a retention device for fastening the gas generator on the vehicle body element, which can advantageously be implemented integrally with the gas generator. The retention device can comprise projections and/or openings of a detent connection and/or tabs and/or holes of a screw connection, for example.

The gas generator preferably communicates with the head airbag using one or more filling tubes, which may be situated on or in the vehicle body element extending in the vehicle transverse direction, in an A column, and/or in a roof frame of the vehicle, for example.

The head airbag and the gas generator may advantageously be fastened independently of one another on the vehicle body element, which improves the flexibility during the installation and in particular makes later retrofitting or replacement of components of the head airbag system easier. Of course, the complete head airbag system can also be fastened as a complete module on the vehicle.

The gas generator is preferably fastened on the vehicle body element before interior equipment of the motor vehicle is completed, in particular before a dashboard is fastened on the vehicle body. In this way, the worker has a workspace which is accessible and visible easily from all sides and great freedom of movement.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
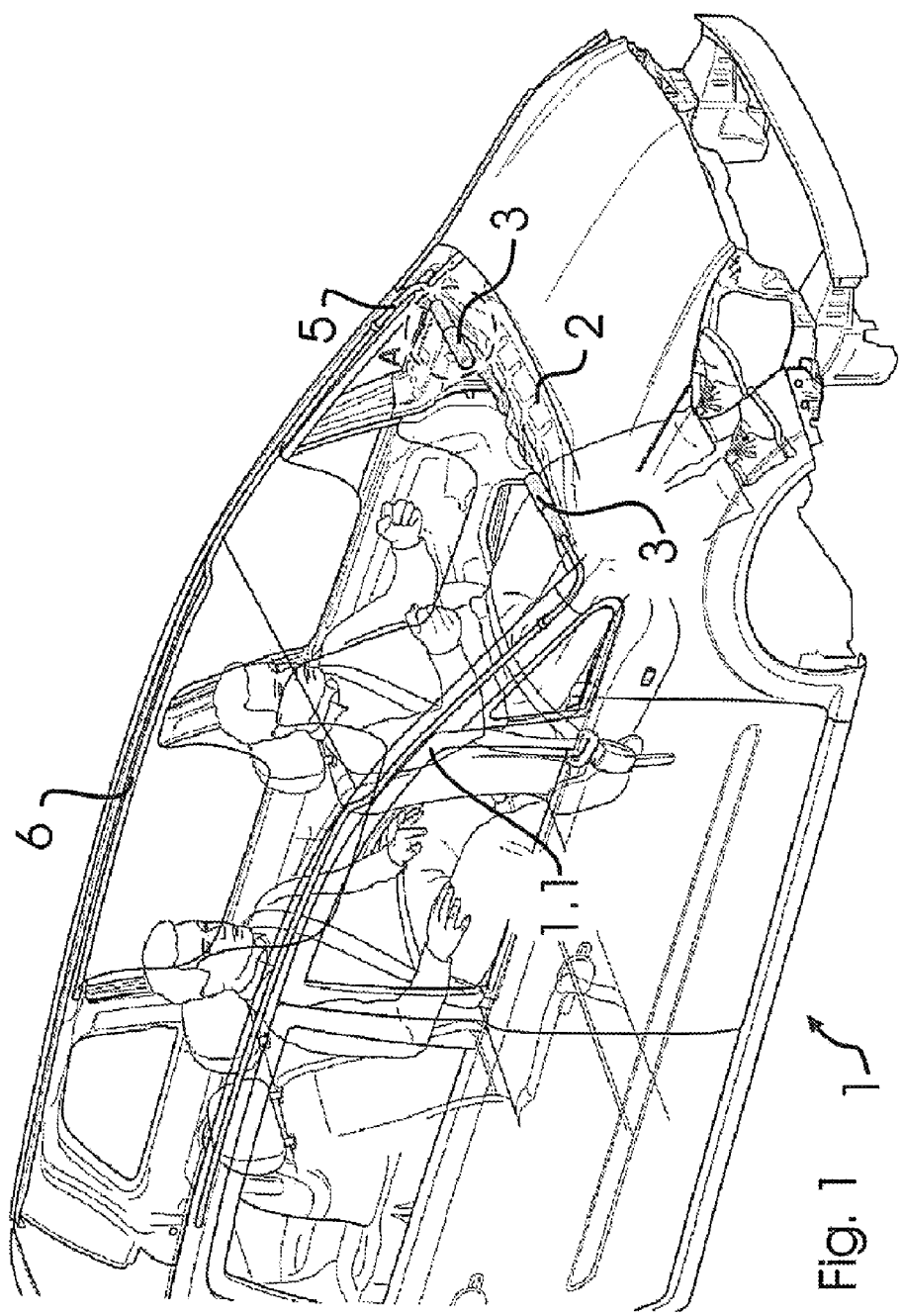
FIG. 1 shows a motor vehicle according to an embodiment of the present invention in perspective partial section.

A motor vehicle according to an embodiment of the present invention is shown in perspective partial section in FIG. 1. The vehicle body or vehicle structure 1 having A columns 1.1, B and C columns, a roof frame, and a windshield crossbeam 2, which extends essentially in the vehicle transverse direction, may be seen.

Figure 3:
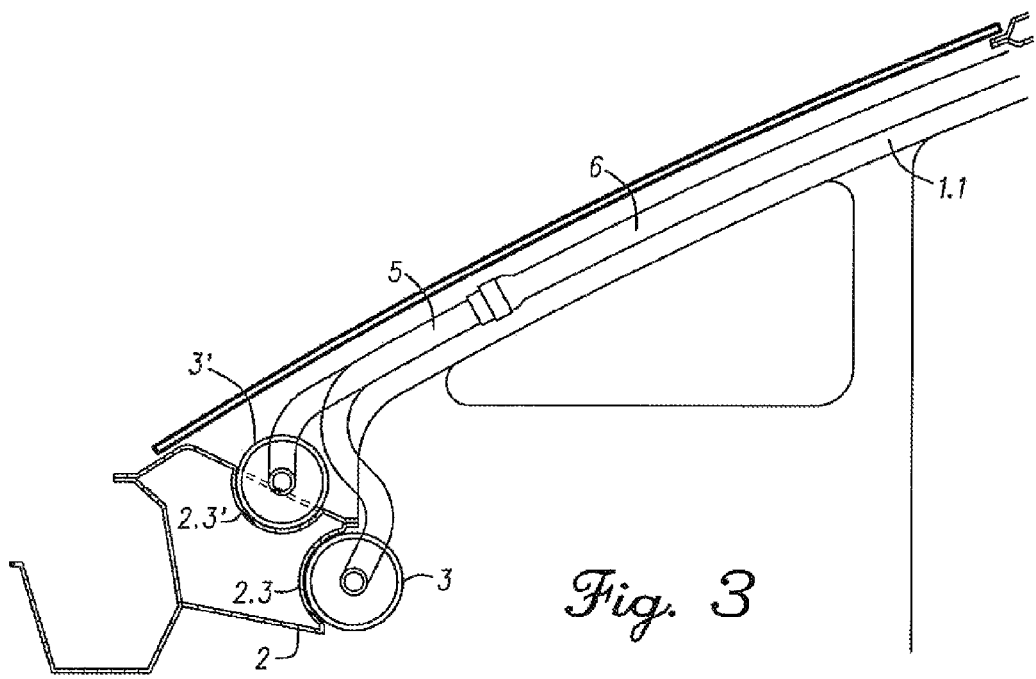
FIG. 3 shows a lateral section of the motor vehicle according to FIG. 1.

As may also be seen in FIG. 3, a tubular head airbag 6 is fastened in a way which is not shown in greater detail on the roof frame and the A columns 1.1 for each vehicle side and connected to a gas generator 3 in each case via a filling tube 5, which is received in the A column 1.1 and the windshield crossbeam 2.

The gas generators 3 are implemented as essentially cylindrical and are fastened to the vehicle body 1 so that their longitudinal axis runs essentially parallel to the transverse axis of the motor vehicle.

Figure 2:
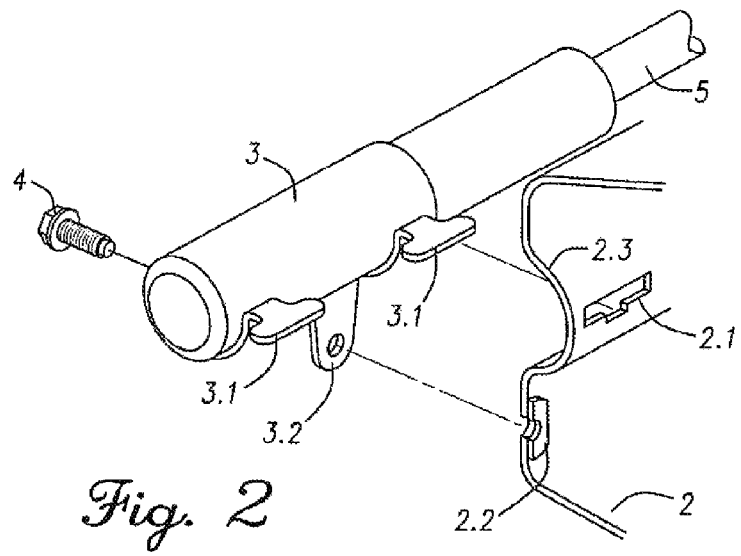
FIG. 2 shows a detail identified in FIG. 1 by A.

In a first embodiment, shown in FIG. 1, FIG. 2, and FIG. 3, the windshield crossbeam 2 has depressions 2.3 having a semicircular cross-section on its rear vertical side (left in FIG. 2, right in FIG. 3), which are essentially open to the rear. The cylindrical gas generators 3 are partially received in these depressions 2.3, as shown in FIG. 3 in particular. As indicated in FIG. 2, they are positively mounted using projections 3.1 in openings 2.1 of the windshield crossbeam 2 and additionally fixed using a screw 4, which penetrates a tab 3.2 of a gas generator 3 and a hole 2.2 of the windshield crossbeam 2. The projections 3.1 and the tabs 3.2 form a retention device, which is implemented integrally with the gas generator 3.

In a second embodiment, which is only shown superimposed in FIG. 3, the windshield crossbeam 2 has depressions 2.3' having a semicircular cross-section on its top cover side (top in FIG. 3), which are essentially open on top. As described above with reference to the first embodiment, the cylindrical gas generators 3' are partially received in these depressions 2.3', the gas generators being positively mounted using projections in openings of the windshield crossbeam 2 and additionally being fixed using screws (not shown). This embodiment allows particularly simple installation through the insertion of the gas generators 3' from above into the depression 2.3'.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a vehicle body comprising an element that essentially extends in a vehicle transverse direction, the vehicle body further comprising a roof frame;
   a head airbag that essentially extends in a vehicle longitudinal direction, the head airbag mounted to the roof frame; and
   a gas generator adapted to fill the head airbag and fastened on the element of the vehicle body that essentially extends in the vehicle transverse direction, wherein the gas generator is directly fastened in a depression of the element, wherein the depression is in a vertical side of the element, wherein the gas generator comprises a retention device adapted to fasten the gas generator on the element.

2. The motor vehicle according to claim 1, wherein the element is a windshield crossbeam.

3. The motor vehicle according to claim 1, wherein the gas generator is removably fastened on the element with the retention device.

4. The motor vehicle according to claim 3, wherein the retention device includes a hole such that the gas generator is screwed onto the element.

5. The motor vehicle according to claim 1, wherein the retention device is integrally implemented with the gas generator.

6. The motor vehicle according to claim 1, wherein the vehicle body further includes an A-column and a window crossbeam, the A-column extending between the roof frame and the window crossbeam, and wherein the gas generator and the head airbag are coupled by a filling tube extending through the A-column.

7. The motor vehicle according to claim 1, wherein the gas generator is essentially cylindrical and has a longitudinal axis running essentially parallel to a transverse axis of the motor vehicle.

8. The motor vehicle of claim 1, wherein the vehicle body further comprises a dashboard, the element being within an interior portion of the dashboard.

9. A method for installing a head airbag in a motor vehicle, comprising the steps of:
   fastening the head airbag on a roof frame of the motor vehicle;
   fastening, in a position forward of a dashboard, a gas generator on an element of a vehicle body that essentially extends in a transverse direction of the motor vehicle, the gas generator being adapted to fill the head airbag, wherein the step of fastening the gas generator on the element comprises the step of directly fastening the gas generator in a depression in a vertical side of the element; and
   coupling the gas generator and the head airbag with a filling tube extending through an A-column of the motor vehicle.

10. The method according to claim 9, wherein the step of fastening the gas generator on the element is executed before completing an interior equipping of the motor vehicle.

11. A motor vehicle, comprising:
- a vehicle body comprising an element that essentially extends in a vehicle transverse direction, the vehicle body further comprising a roof frame;
- a head airbag that essentially extends in a vehicle longitudinal direction, the head airbag mounted to the roof frame; and
- a gas generator adapted to fill the head airbag and fastened on the element of the vehicle body that essentially extends in the vehicle transverse direction, wherein the gas generator is directly fastened in a depression of the element, wherein the depression is in a vertical side of the element,
- wherein the vehicle body further comprises a dashboard, the element being forward of the dashboard or within an interior portion of the dashboard.

* * * * *